Sept. 24, 1968   R. W. MILLER   3,402,678
HAND BRAKE FOR FLAT DECK CAR
Filed Dec. 19, 1966   2 Sheets-Sheet 1
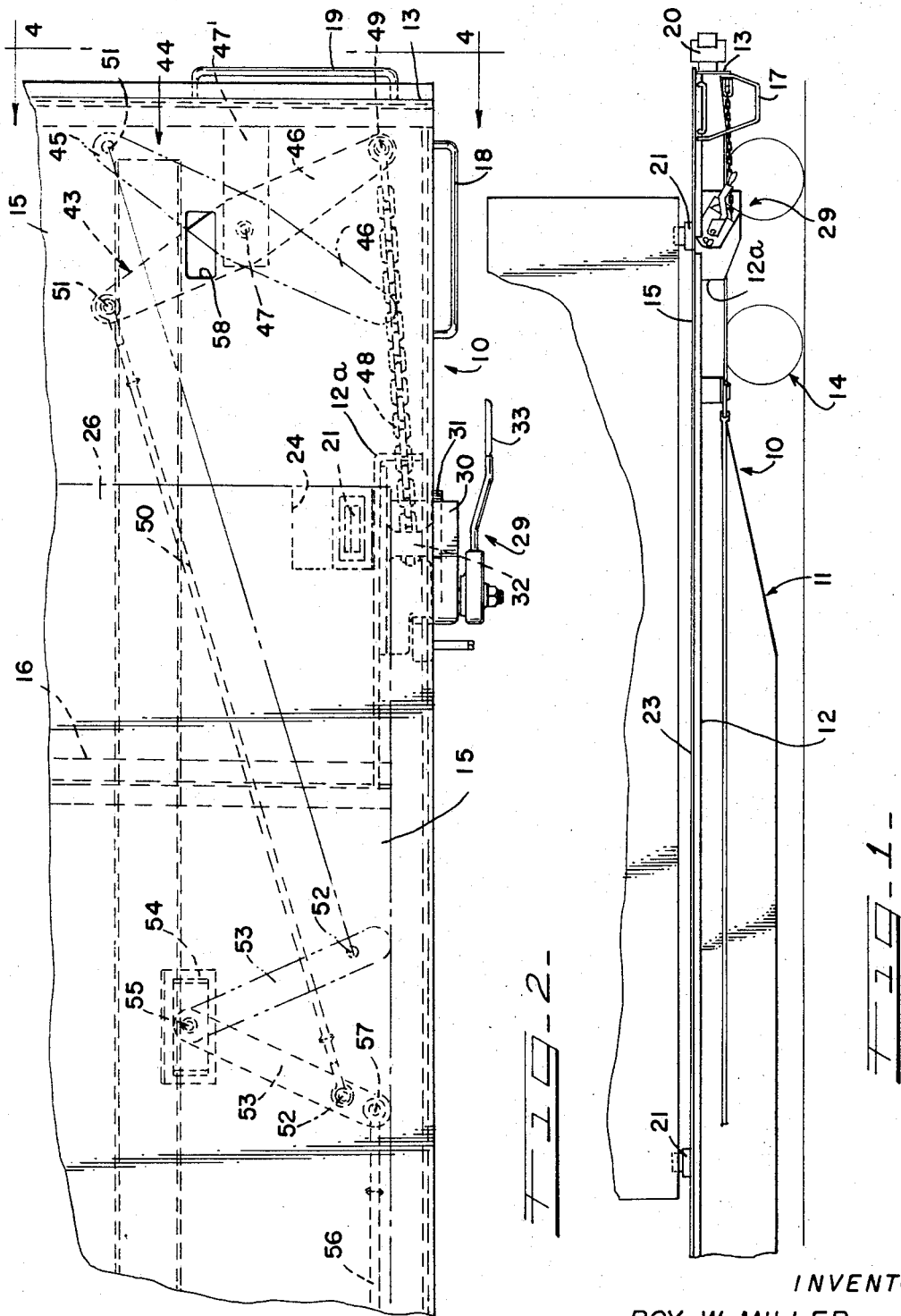
INVENTOR
ROY W. MILLER
BY
ATT'Y.

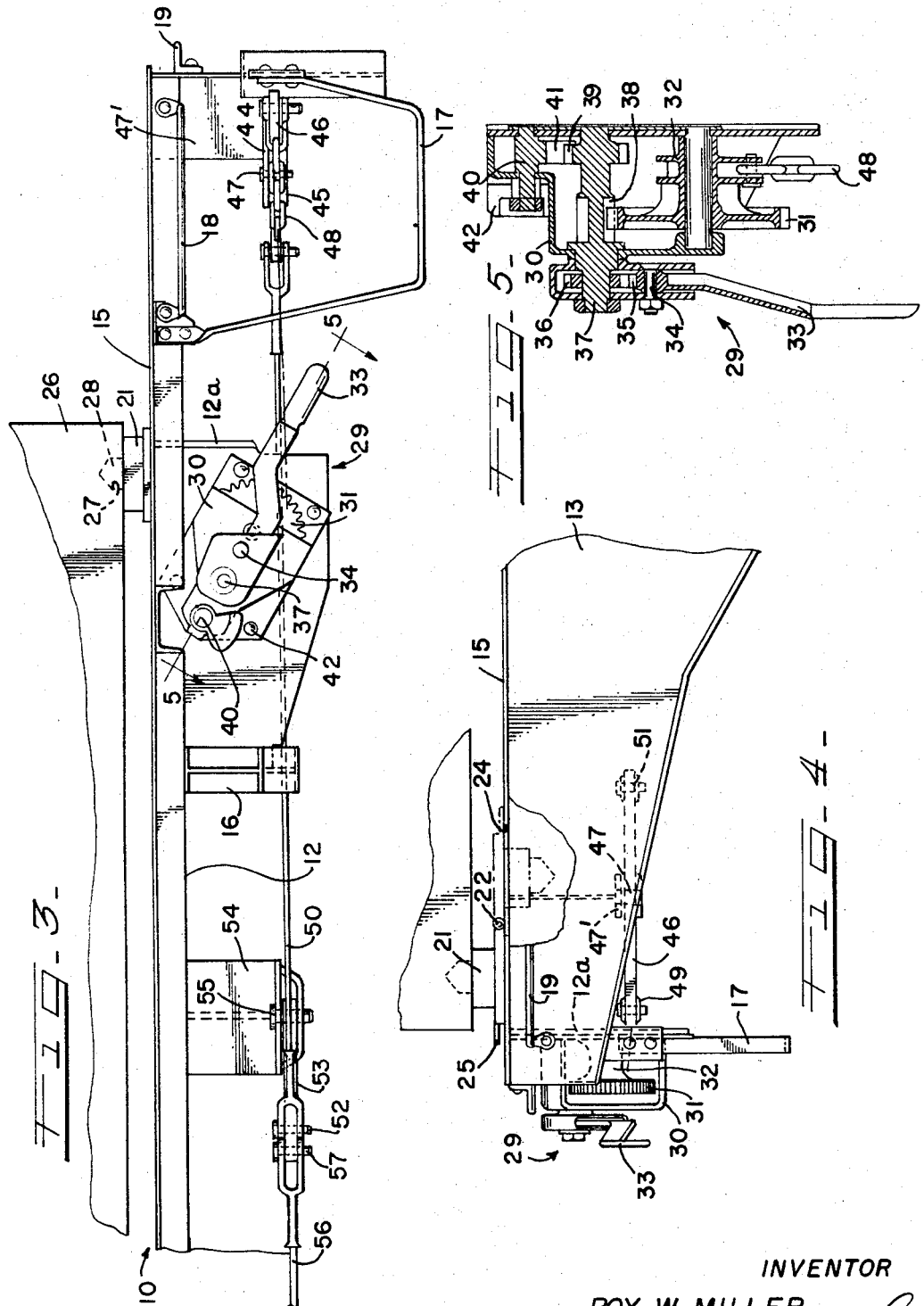

United States Patent Office 3,402,678
Patented Sept. 24, 1968

3,402,678
HAND BRAKE FOR FLAT DECK CAR
Roy W. Miller, Highland, Ind., assignor to Pullman Incorporated, Chicago, Ill., a corporation of Delaware
Filed Dec. 19, 1966, Ser. No. 602,782
6 Claims. (Cl. 105—366)

ABSTRACT OF THE DISCLOSURE

A hand brake arrangement for flat cars with provisions to support containers thereon, including brake rigging, brake arms and linkages located underneath and inside of the flat deck of the car and being located in proximity to and connected to the hand brake mechanism which is located within ready reach of the operator who may be supported either on the side of the car or at one end of the deck of the car which also includes a hand hold spaced from the end of the car and from the container which may be carried thereon.

Background of the invention

1. *Field of the invention.*—This invention relates to a hand brake mechanism particularly adapted to a flat car designed for carrying one or more freight containers. Containers of this type are generally adapted for over the highway travel but on loading of the container onto the flatcar the bogies are removed and the containers are supported on container blocking members which engage the corners of the containers to secure them to the flat deck of the car. To meet AAR requirements the hand brake mechanism must be located below the deck of the car so as not to interfere with ready access therewith and provisions are made on the car so that the operator who manipulates the hand brake mechanism can either readily reach and actuate the same from the side of the car or from the top deck of the car, the locations of the mechanisms being such that a safe and ready access to the same is had by the operator. It is this field of art to which the invention pertains.

2. *Description of the prior art.*—Heretofore hand brake mechanisms for flat cars have been located inwardly from the ends of the car and in most cases have projected upwardly above the deck. In some cases the hand brake mechanisms have been mounted on pedestals disposed on the side of the car and projecting upwardly above the deck and some of these pedestals have been collapsible or rotatable to move them into an out of the way position during loading of the car. With the advent of trailer on flatcar loadings and with the increase of container freight shipments it has been necessary to dispose the hand brake below the deck line of the car so as to permit end handling, side handling and overhead handling so that there is no interference with the loading operations. The location of the hand brake below the deck of the car and at the side of the car in prior constructions had made it difficult for the operator to actuate the brake mechanism and also to securely position himself on the car in a safe and convenient manner. The hand brake riggings have become complex as a result of various constructions attempting to solve the problem and the present invention provides for an effective solution with a simplified hand brake rigging which locates the rigging parts underneath the car in a manner to accent the leverage obtained from the hand brake which is now readily accessible to the operator from a station which is located clear of the container or freight loaded upon the flat car.

Summary

The invention relates to an improved hand brake mechanism for flat cars particularly adapted to support containers and specifically to the rigging arrangement which is entirely located beneath the deck of the car in proximity to the manual hand brake mechanism. Further, the invention includes provisions on the flat car of an unobstructed deck portion located in longitudinally spaced relation from the container which provides recessed hand hold means that may be utilized for supporting an operator in proximity to the manually operated hand brake mechanism which is also disposed below the deck of the car and to one side thereof so that the flat deck of the car is substantially open for achieving end loadings, side loading and crane loading of containers or other freight.

Brief description of the drawing

FIG. 1 is a side elevational view of a portion of a flat deck car having a container supported thereon, and showing at one end of the car an improved hand brake mechanism, the view having side portions broken away to illustrate the brake rigging underneath the deck of the car;

FIG. 2 is an enlarged fragmentary plan view of one end of a flat deck car showing the location and details of an improved hand brake mechanism and rigging therefor;

FIG. 3 is a side elevational view of the end portion of the flat car shown in FIG. 2;

FIG. 4 is an elevational end view taken substantially along the line 4—4 of FIG. 2 having portions of the end sill of a flat deck car broken away to illustrate a non-operating position of a corner container locking member;

FIG. 5 is a cross sectional view of a hand brake mechanism of conventional design for operating a hand brake rigging arrangement.

Description of the preferred embodiment

Referring now to FIGS. 1 through 5 a portion of a flat deck car is generally designated by the reference character 10. The car 10 includes a frame 11 of the fish belly type and of side sills 12 and provided at opposite ends of the car 10 with end sills 13. In FIG. 1 only one-half of the car has been shown it being understood that the car structure with the exception of the hand brake mechanism is substantially identical at both ends. The frame 11 is suitably supported on wheel trucks 14 and the frame 11 supports a substantially flat deck 15 co-extensive with the car. The type of flat car disclosed is usually at least 85 feet long and thus can readily support two conventional containers each having a length of 40 feet. The car frame also is suitably inter-connected by means of cross-members 16, only one of which is shown in FIGS. 2 and 3. A sill step 17 and hand grab 18 are suitably supported on the side sill 12 as indicated in FIGS. 1 through 4. A hand grab 19 is supported on the end sill 13. The reference character 20 indicates one of the conventional couplers.

The present flat car 10 may be suitably arranged for carrying wheeled trailers but for the present disclosure the car has been equipped with container hold down members 21. The container hold down members 21 are suitably spaced on the deck 15 to accommodate and engage the four corners of each container which may be carried on the car. Each container hold down 21 is suitably hinged at 22 to the deck 15 so that it may easily be rotated into an out of the way position through an opening 24 in the deck 15. Each container hold down 21 is also provided with a lip 25 which engages a deck portion 15 adjacent the opening 24 to support the container hold down 21 in a recessed or out of the way position when the car is utilized for other purposes than container transport. A container is designated at 26 the said container having suitable corner portions apertured as indicated at 27 in FIG. 3 to receive the engaging projections 28 of each container hold down 21.

Referring particularly to FIGS. 3, 4 and 5, a hand brake mechanism is generally indicated at 29, the hand brake mechanism 29 comprises a housing 30 suitably secured to the side support 12a in the region of one of the trucks as indicated in FIG. 2. The housing 30 rotatably supports a gear 31 which has connected thereto for rotation therewith a wind up spool 32. A pump type handle 33 is pivotally connected to the housing as indicated at 34 the said handle 33 having an actuating projection 35 adapted to engage and rotate a gear 36 keyed to a shaft 37 suitably supported on the housing 30. The shaft 37 also includes gear teeth 38 which are adapted to engage with the gear 31 to rotate the same upon pivotal (ratchet like) actuation of the handle 33. A gear 39 is integral with the shaft 37 and is adapted to cooperate with a lock member 40 rotatively mounted on the housing 30. The lock member 40 includes a stop tooth 41 which in the position indicated prevents rotation of the shaft 37 in a clockwise manner. The stop member 40 has connected thereto a counter weight 42 best shown on FIG. 3 which, by gravity, keeps the shaft 40 in the position indicated in FIG. 5 so as to lock the shaft 37 against release when the wind up spool has been rotated in a wind up position.

The hand brake mechanism 29 is adapted to actuate a hand brake rigging generally designated at 43 in FIG. 2. The rigging 43 includes a hand brake lever 44 having a first end 45 and a second end 46, and being intermediate its ends pivotally connected by means of a pivot pin 47 to a bracket 47' projecting downwardly from the deck 15. A flexible member in the form of a chain 48 is connected at one end as indicated at 49 to the second end 46 of the hand brake lever 44. The chain 48 is suitably secured as indicated in FIG. 5 to the wind up spool 32.

The first end 45 of the hand brake lever 44 has a connecting brake rod 50 pivotally connected thereto as indicated at 51. The connecting brake rod 50 is also pivotally connected as indicated at 52 to a transfer arm 53 which is pivotally supported as indicated at 55 on a bracket 54 projecting downwardly of the deck 15. A brake cylinder rod 56 is pivotally connected to the transfer arm 53 as indicated at 57 the said rod 56 extending to the brake cylinder for actuating the same in a conventional manner. The operation of the brake cylinder and brake rigging parts are conventional, well known in the art, and are not shown in the present disclosure.

As best shown in FIG. 2 the container hold downs 21 are so positioned that the container 26 is longitudinally spaced from the end of the car 10 to leave a space which is relatively unobstructed on the deck 15 the same being provided with a hand hold 58 formed by aperturing the deck. The hand hold 58 is positioned so that an operator standing on the sill step 17 may support himself partially on the unobstructed deck portion and grasp the hand hold 58 with his right hand whereby he can very easily and simply actuate the hand brake mechanism lever arm or handle 33 for actuating the brake mechanism with his left hand. The hand brake mechanism 29 is of conventional design and is adapted to tighten the hand brake rigging 43 in the area of 3,000 lbs. pressure. This load occurring through all of the rigging elements.

As the operator is securely positioned on the unobstructed portion of the deck he moves the lever 33 up and down causing the tooth 35 to rotate the gear 36 in a ratchet like manner counter-clockwise thereby winding up the chain 48 on the spool to a tension or wind up position wherein as shown in FIG. 2 the brake lever portion 46 is moved to its furthest clockwise position. In this condition the brake is On and the chain 48 is fully tensioned. The lock member 40 is arranged so that the tooth 41 prevents clockwise release of the shaft 37 and thus the wind up spool is maintained in the wound up position. To release the wind up spool and to permit the hand brake lever 44 to assume the position shown in FIG. 2 wherein the end 46 is positioned at its furthest counter-clockwise position it is a simple matter to rotate the counter weight 42 in a clockwise direction and the shaft 37 is released.

It can be seen therefore that the brake rigging and brake mechanism are so positioned as to be readily accessible by the operator and provisions are made so that the operator has a safe place from which to actuate the mechanism. Further the arrangement of the mechanism is such that there can be no interference during loading and unloading operations of the flat car and the brake rigging is disposed completely beneath the deck of the car in a manner to provide the best leverage application and the simplest design. The mechanism therefore is within AAR requirements.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a railway car especially adapted to transport containers comprising an elongated frame supported on longitudinally spaced wheel trucks and having a substantially flat deck including a plurality of locking members projecting upwardly from said deck for engaging containers carried by said deck, and a sill step carried by said frame and disposed longitudinally outwardly from one of said trucks;

a hand brake mechanism supported by said frame below said deck at one side thereof and including a rotatable wind up spool, a rotatable shaft for rotating said spool and having connected thereto manual actuating means operatively disposed below said deck for rotating said spool to a wind up position, and means for releasing said spool from said position, hand brake rigging means disposed below said deck, said means including, a transfer arm pivotally connected to said frame, for swinging movement in a horizontal plane, a brake cylinder rod connected to said transfer arm and adapted to be moved longitudinally thereby, a hand brake lever pivotally connected to said frame below said deck in proximity to said sill step, said lever including first and second opposite end portions spaced laterally outwardly from said pivotal connection, a connecting rod having one end pivotally connected to said first end portion and extending longitudinally diagonally and having another end pivotally connected to said transfer arm for pivoting the same, and a flexible tension member connected to said second end portion and to said wind up on spool whereby during rotation of said spool to said wind up position said hand brake lever is rotated to actuate said transfer arm and brake cylinder rod.

2. The invention according to claim 1, and said transfer arm being positioned longitudinally forwardly at one of said trucks and said brake lever arm being positioned longitudinally rearwardly of said one truck, and said brake rigging means being disposed entirely underneath said flat dack.

3. The invention according to claim 1, and
said deck including a recessed hand hold portion in said deck and being located in longitudinally outwardly spaced relation from said locking members and a container on said deck.

4. The invention according to claim 1, and
said transfer arm having its pivotal point of connection disposed inwardly toward the longitudinal centerline of said car and said transfer arm extending laterally outwardly with respect thereto.

5. The invention according to claim 1, and
said deck including an end portion spaced longitudinally from said container locking members and from a container carried thereby to provide an unobstructed deck portion for supporting an operator in proximity to said manual actuating means.

6. The invention according to claim 5, and
said unobstructed deck portion having a recess therein providing hand hold means for said operator, and said spool being disposed inwardly from said one side of said deck.

References Cited

UNITED STATES PATENTS 3,163,128  12/1964  Enochian _____ 105—368
3,294,035  12/1966  Enochian _____ 105—368

DRAYTON E. HOFFMAN, *Primary Examiner.*